United States Patent [19]

Prevedello et al.

[11] Patent Number: 5,221,344
[45] Date of Patent: Jun. 22, 1993

[54] CONCRETE COMPOSITION CONTAINING A SUPERFLUIDIFYING ADDITIVE

[75] Inventors: Aldo Prevedello, San Donato Milanese; Edoardo Platone, Asti; Dario Ercolani; Elio Donati, both of Fano, all of Italy

[73] Assignees: Eniricerche S.p.A.; Snamprogetti S.p.A., both of Milan, Italy

[21] Appl. No.: 877,835

[22] Filed: May 1, 1992

Related U.S. Application Data

[63] Continuation of Ser. No. 729,619, Jul. 15, 1991, abandoned, which is a continuation of Ser. No. 348,851, May 8, 1989, abandoned.

[30] Foreign Application Priority Data

May 13, 1988 [IT] Italy ................. 20562 A/88

[51] Int. Cl.⁵ .............. C04B 24/20; C04B 28/04; C04B 24/02; C04B 24/20
[52] U.S. Cl. .................. 106/807; 106/725; 106/726; 106/806; 106/809; 106/822
[58] Field of Search ............... 106/664, 665, 725, 726, 106/806, 807, 809, 822

[56] References Cited

U.S. PATENT DOCUMENTS 2,512,067 6/1950 Linford ................. 106/724
3,970,690 7/1976 Suzuki et al. .
4,224,076 9/1980 Moitra et al. .

FOREIGN PATENT DOCUMENTS 2261659 12/1972 Fed. Rep. of Germany ..... 106/725
60-171257 9/1985 Japan ................. 106/668
983102 5/1981 U.S.S.R. .

Primary Examiner—David Brunsman
Attorney, Agent, or Firm—George P. Hoare, Jr.

[57] ABSTRACT

A concrete composition contains hydraulic cement, inerts, water and superfluidifying additive obtained by salifying, in the form of an alkaline metal, alkaline earth metal or ammonium salt, the sulphonated and oxidised products resulting from the reaction between sulphur trioxide and fuel oil deriving from steam cracking. This concrete composition has improved workability characteristics and enables concretes to be obtained generally possessing greater strength and durability.

9 Claims, No Drawings

CONCRETE COMPOSITION CONTAINING A SUPERFLUIDIFYING ADDITIVE

This is a continuation, of application Ser. No. 07/729,619, filed Jul. 15, 1990, now abandoned, which in turn is a File Wrapper Continuation Application of application Ser. No. 07/348,851, filed May 8, 1989 now abandoned.

This invention relates to a concrete composition containing a superfluidifying additive.

It is known in the art to use additives which are added to the concrete before or during mixing.

These include chemical additives, aerating agents and others. Their effects on the concrete are positive, including a smaller water requirement, improved workability, controlled setting and hardening and increased durability.

In particular, superfluidifying agents are increasingly widely used, especially in the form of water-soluble salts of the products of condensation between formaldehyde and melamime sulphonated or naphthalene sulphonate. Said superfluidifying additives result in improved cement dispersion with the effect of making the mix more fluid.

For equal water/cement ratios this improved workability can facilitate the laying of concrete castings and can also allow vibration to be limited or dispensed with. Alternatively, it becomes possible to increase the mechanical strength of the concrete by reducing its water/cement ratio while maintaining equal workability of the mix.

U.S. Pat. No. 3,277,162 describes the ammonium, sodium, potassium and calcium salts of the products of condensation between formaldehyde and napthalenesulphoic acid, which can inter alia be used to reduce water losses from cement compositions injected into oil wells.

However, the superfluidifying additives of the known art are costly and their preparation process is costly and difficult, with the result that there is the need for superfluidifying additives which are more economical and easier to prepare. There is also a felt need for superfluidifying additives able to further improve the characteristics of concrete compositions and of the concretes obtainable from said compositions.

It has now been found that such requirements can be satisfied by the concrete compositions of the present invention, which contain hydraulic cement, inerts, water and a superfluidifying additive, said compositions being characterised in that said superfluidifying additive is the salificaiton product, in the form of an alkaline metal, alkaline earth metal or ammonium salt, of the sulphonated and oxidised products resulting from the reaction between sulphur trioxide and fuel oil deriving from steam cracking.

Fuel oil deriving from steam cracking is the residual hydrocarbon fraction in the production of ethylene and other lower hydrocarbons by pyrolysis of naphthas and gas oils. This hydrocarbon fraction has a high aromatic compounds content, at least 50 wt % of these being bicyclic or polycyclic condensed ring aromatic compounds in accordance with ASTM D-3239-81.

The superfluidifying additive used in the concrete composition of the present invention is obtained by reacting liquid or gaseous sulphur trioxide with the hydrocarbon fraction operating with a weight ratio of between 0.5/1 and 2.0/1, and preferably of the order of 0.8/1-1.2/1.

This reaction is preferably conducted by:

dissolving the hydrocarbon fraction in a non-sulphonatable organic solvent;

bringing the solution thus obtained into contact with liquid or gaseous sulphur trioxide, respecting the aforesaid ratios between the two reactants;

reacting them together at a temperature of between 90° and 120° C. for a time of between 0.5 and 3 hours, removing the sulphur dioxide as it forms during the reaction;

after cooling, neutralizing the reaction products with an alkaline metal base, alkaline earth metal base or ammonia;

recovering the additive from the neutralization products by eliminating the organic solvent and at least part of the water. For further details of the sulphonation procedure reference should be made to British Patent N. 2 159 536.

In treating the steam-cracked fuel oil with sulphur trioxide not only is there a sulphonation reaction but also an oxidation reaction as demonstrated by the evolvement of sulphur dioxide during the course of the reaction. The additive obtained on treating the reaction products with an alkaline metal base, alkaline earth metal base or ammonia is in all cases a solid containing a preponderant quantity (60-80% by weight) of organic sulfonate and lesser quantities of (10-30% by weight) of alkaline, alkaline earth or ammonium sulphate, together with possible residual moisture. The organic sulphonate can be separated from the reaction mixture, but it is preferable to use the crude reaction product directly.

Generally the compositions of the present invention have a water/cement ratio of between 0.4/1 and 0.6/1 by weight and a cement/inerts ratio of between ⅓ and 1/6 by weight, the superfluidifying additive being present in a weight concentration of between 0.3 and 3% of the cement, said percentage relating to the content of organic sulphonate in the additive.

In the preferred embodiment the water/cement weight ratio varies from 0.42/1 to 0.47/1, the cement/inerts weight ratio varies from 1/4.5 to 1/5.5 and the superfluidifying additive concentration varies from 0.5 to 2.0% by weight of the cement, again referred to the organic sulphonate.

In preparing the compositions of the present invention the normal hydraulic cements such as Portland cement can be used, as can the normal inerts such as sand, gravel, crushed stone and the like. The compositions of the present invention can also contain an antifoaming agent to reduce concrete porosity. For this purpose the normal silicone, alcohol or fatty acid derivative antifoaming agents can be used in a quantity of up to 10% by weight of the superfluidifying additive.

The superfluidifying additive of the present invention is economical because of the raw materials used, and is obtained by a simple and convenient process.

When used in modest concentrations, such an additive gives the concrete compositions improved workability with self-compacting and self-levelling characteristics.

The concretes obtained from said compositions have high strength and durability.

In the experimental examples given hereinafter the following superfluidifying additives are used.:

Additive A: obtained by sulphonating fuel oil from steam cracking with sulphur trioxide using a weight ratio of sulphur trioxide to fuel oil of 0.66/1 and neutralizing the obtained sulphonation product with sodium hydroxide. Such an additive has the following composition:

| organic sulphonate | 79.7% by weight |
| sodium sulphate | 12.7% by weight |
| water | 7.6% by weight |

Additive B: obtained as indicated above but using a weight ratio of sulphur trioxide to fuel oil of 0.89/1. Such an additive has the following composition:

| organic sulphonate | 76.6% by weight |
| sodium sulphate | 15.1% by weight |
| water | 8.3% by weight |

Additive C: obtained as indicated above but using a weight ratio of sulphur trioxide to fuel oil of 1.45/1. Such an additive has the following composition:

| organic sulphonate | 71.8% by weight |
| sodium sulPhate | 19.4% by weight |
| water | 8.8% by weight. |

The steam cracking fuel oil used for preparing the fluidifying additives A, B and C has the following characteristics:

| specific gravity (15° C.) | 1.075 |
| viscosity (50° C.; cst) | 23.8 |

Elementary analysis in % by weight:
C: 92.4,
H: 6.7,
S: 0.1,
N: <0.3.
Water (Karl Fischer) (% by weight): 0.2
Chromatographic separation in % by weight:

| saturateds | 2.6 |
| polars | 13.7 |
| aromatics | 78.6 |

The workability characteristics of the concrete mixes are determined in Example 1 via the characteristics of the corresponding cement pastes. This is for simplicity reasons, as the data obtained are transferable to the concrete mixes.

EXAMPLE 1

200 g of Portland cement 325, water and superfluidifying additive are fed into a bladed mixer in the weight ratio of 100:25:0.5. The latter value relates to the organic sulphonate content of the additives A, B and C.

This feed is stirred in the bladed mixer for 120 seconds at a rotational speed of 60 r.p.m. and a temperature of 20° C. The resultant mixture is used to prepare cylinders of 60 mm height and 35 mm diameter, the area of the resultant speed then being measured. The test is repeated 5 times for each sample.

For comparison purposes the test is repeated using and equal quantity of a commercial fluidifying additive (additive D) formed by salifying into sodium salt form the products of the reaction between formaldehyde and naphthalene sulphonate.

The results relative to workability are given in Table 1, in which the workability of the composition containing the comparison additive (D) is given the value of 100 in conventional manner.

TABLE

| Composition | Relative workability |
|---|---|
| Additive (A) | 100 |
| Additive (B) | 135 |
| Additive (C) | 117 |
| Additive (D) | 100 |

EXAMPLE 2

The following are fed into a mixer:
10 kg of Portland cement 325
30 kg of dry gravel
20 kg of sand
4.17 kg of water
0.405 kg of an aqueous solution containing 17% of additive (B) evaluated with reference to the organic sulphonate contained in the additive.

In this composition the water/cement weight ration is equal to 0.45/1 and the additive quantity is 0.69 wt % of the cement. The feed is mixed for 3 minutes and a cone is then prepared for a slump test operating in accordance with the UNI 7163 standard. A 21 cm slump is obtained.

For comparison purposes the aforesaid composition is prepared without the fluidifying additive, a 1 cm slump then being obtained.

EXAMPLE 3

The following concrete compositions are prepared operating as in Example 2.

Test 1

10 kg of Portland cement 325;
30 kg of dry gravel;
20 kg of sand;
5 kg of water.

Test 2

10 kg of Portland cement 325;
30 kg of dry gravel;
20 kg of sand;
4.5 kg of water;
0.70% of the cement weight as superfluidifying additive (B) (evaluated as organic sulphonate);
0.06% of the cement weight as alcoholic foaming agent.

Test 3

10 kg of Portland cement 325;
30 kg of dry gravel;
20 kg of sand;
4.3 kg of water;
1.40% of the cement weight as superfluidifying additive (B) (evaluated as organic sulphate);
0.12% of the cement weight as alcoholic foaming agent.

The slump test is carried out on these composition, the result being expressed in cm and evaluated in accordance with UNI 7163. The following values are obtained: test 1=6 cm; test 2=5 cm; test 3=6 cm.

The compositions are used to form concrete cubes of six 16×16×16 cm operating in accordance with UNI 6132.

These cubes are cured in water at 20° C. for 28 days after which their compressive strength is determined.

The results of three tests repeated three items each are as follows:

Test 1 = 320, 324 and 318 kg/cm$^2$;

Test 2 = 404, 392 and 405 kg/cm$^2$;

Test 3 = 488, 480 and 463 kg/cm$^2$;

We claim:

1. A concrete composition consisting essentially of a hydraulic cement, aggregates, water and a superfluidizing additive, wherein the superfluidizing agent is present in an amount of from 0.3% to 3% by weight of the cement, said superfluidizing additive being prepared by the process comprising sulphonating and oxidating a fuel-oil, obtained as a residue of the steam-cracking of a highly aromatic hydrocarbon fraction comprised of naphtha and gas oils in the production of ethylene and other lower hydrocarbons and dissolved in a non-sulphonatable organic solvent, with liquid or gaseous sulfur trioxide, having a weight ratio of sulfur trioxide to said fuel oil of 0.5:1 to 2.0:1, at a temperature of from 90° C. to 120° C. for a time of from 30 minutes to 3 hours, continuously removing sulfur dioxide from the reaction, and neutralizing the resultant product with an acid-binding agent selected from the group consisting of alkali metal bases, alkaline earth metal bases and ammonia.

2. The composition of claim 1, wherein the aggregates are selected from sand, gravel and stone chippings.

3. The composition of claim 1, wherein the step of preparing the additive further comprises removing the organic solvent and recovering the additive.

4. The composition of claim 1, wherein the weight ratio of sulfur trioxide to fuel oil is from 0.8/1 to 1.2/1.

5. The composition of claim 1, wherein the weight ratio of water to cement is from 0.4/1 to 0.6/1 and the weight ratio of cement to aggregates is from ⅛ to 1/6, and the superfluidizing additive is present in a concentration of from 0.3 to 3% by weight with respect to the cement.

6. The composition of claim 1, wherein the weight ratio of water to cement is from 0.42/1 to 0.47/1, and the weight ratio of cement to aggregates is from 1/4.5 to 1/5.5, and the superfluidizing additive is present in a concentration of from 0.5 to 2.0% by weight with respect to the cement.

7. The composition of claim 1, further consisting essential of an antifoaming agent.

8. The composition of claim 7, wherein the antifoaming agent is selected from the group consisting of silicones, and alcohols.

9. The composition of claim 1, wherein the hydraulic cement is Portland cement.

* * * * *